Figure 1:
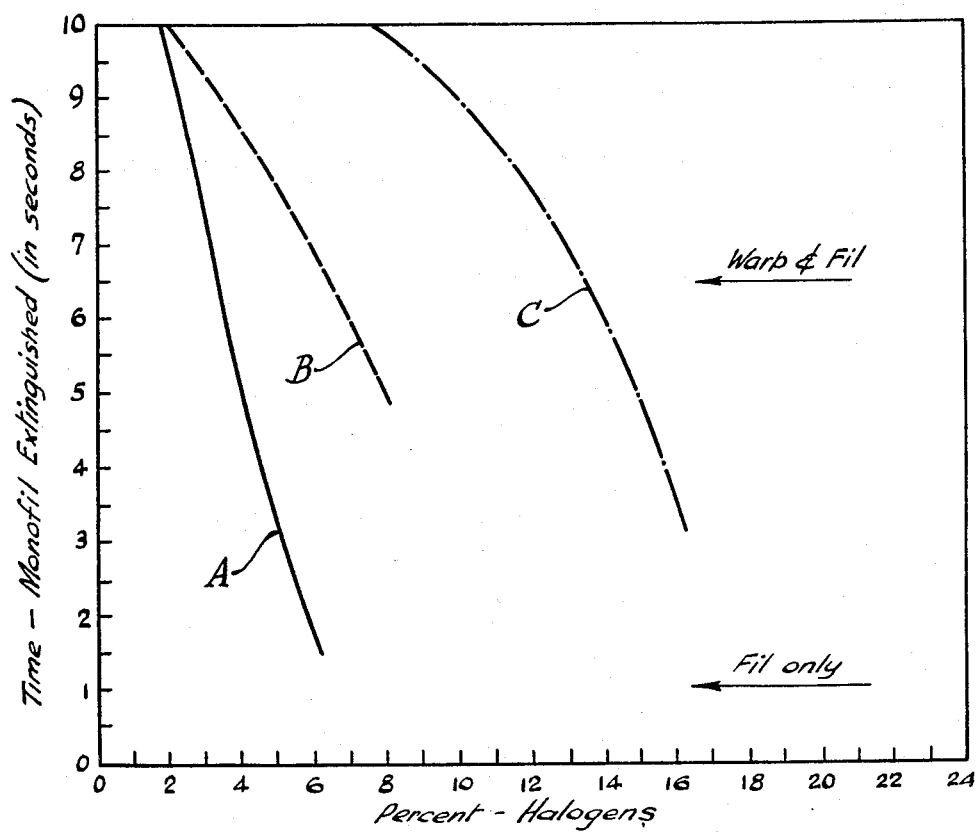

United States Patent
Listner

[15] 3,650,300
[45] Mar. 21, 1972

[54] FIRE RETARDANT POLYOLEFINS

[72] Inventor: Gregory Julius Listner, Kendall Park, N.J.

[73] Assignee: Johnson & Johnson

[22] Filed: Oct. 31, 1968

[21] Appl. No.: 774,222

Related U.S. Application Data

[63] Continuation-in-part of Ser. No. 706,986, Feb. 20, 1968.

[52] U.S. Cl................................139/420, 161/70, 161/403, 260/33.8 UA, 260/45.7 P, 260/45.7 R, 260/45.8 N, 260/45.85, 260/45.95, 260/94.9 GD
[51] Int. Cl.........................................C08f 45/58, C09k 3/28
[58] Field of Search ...............260/45.7 R; 161/403; 139/420

[56] References Cited

UNITED STATES PATENTS

| | | | |
|---|---|---|---|
| 3,412,052 | 11/1968 | Taylor et al............................260/2.5 |
| 3,058,926 | 10/1962 | Eichhorn................................260/2.5 |
| 3,058,941 | 10/1962 | Birum....................................260/30.6 |
| 3,403,118 | 9/1968 | Listner...................................260/23 |

*Primary Examiner*—Donald E. Czaja
*Assistant Examiner*—R. A. White
*Attorney*—Alexander T. Kardos, John H. Tregoning and Robert L. Minier

[57] ABSTRACT

This invention relates to poly-α-olefin compositions made fire retardant by the addition thereto of an antioxidant, a bromine or a chlorine phosphate, a free radical initiator, and a dispersant.

24 Claims, 2 Drawing Figures

FIRE RETARDANT POLYOLEFINS

This patent application is a continuation-in-part of my copending application Ser. No. 706,986, filed Feb. 20, 1968, now abandoned.

Flame retardancy has become a major consideration for many plastic articles used in industrial, commercial and household products. The poly-α-olefins have been, and are being considered in these areas specifically in the textile area where filaments of these polymers with their many desirable chemical and physical properties offer much in specific end uses; however, the art has not been able to develop a satisfactory fire retardant additive, or additives, for polyolefins. In selecting such an additive, care must be taken that the additive does not alter the properties of the resin, e.g., color, flexibility, tensile strength, electrical properties, softening point, etc.; however, to date, the art has been unable to develop a suitable system which will impart fire retardancy to poly-α-olefins without unsatisfactorily affecting some of the desirable properties of the resin.

The instant invention overcomes these and other difficulties by providing a fire retardant polyolefin composition comprising a union of a poly-α-olefin, a fire retardant compound, a dispersant for said fire retardant compound, a free radical initiator and an inhibitor-antioxidant.

With specific reference to a definition for the active fire retardant additive, i.e., a specific class of bromine phosphate or chlorine phosphate compounds or a combination thereof which shall hereinafter be referred to as the "vultard" compound(s) or additive(s), it has been found that this vultard additive must (a) be resistant to water and weathering, (b) contain no water and be sufficiently low in vapor pressure so that it can be extruded without gasing, (c) have sufficient thermal stability at the extrusion temperatures for the poly-α-olefin used, (d) be capable of being made compatible with the poly-α-olefin at extrusion and end-use temperatures so as not to separate or exudate from the polymer, (e) contain a high percentage of bromine or chlorine so that a small amount of the additive will be effective, since the addition of any significant amount of additive would undoubtedly destroy or impair desirable polymer properties, and (f) be essentially nonreactive with the base poly-α-olefin polymer at extrusion temperatures, yet be sufficiently reactive or unstable at ignition temperatures to extinguish a flame or impede combustion. This defines the vultard compound which provides the active fire retardant features, and is thus, the most essential additive element, in this invention. As used herein, the term "halogen" shall refer only to chlorine and to bromine as contained by the vultard compounds. Representative examples of such compounds are "Phosgard" B52RS, i.e.,

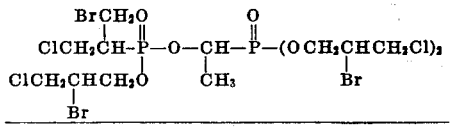

tris-2, 3-dibromopropyl phosphate, i.e., $(BrCH_2CHBrCH_2O)_3$—$P$=0. The organic bromine phosphates represent the preferred vultard compounds in this invention.

It is essential that the vultard compound impart fire resistance, but it must also have sufficient thermal stability, i.e., be substantially stable when held at a temperature of about 125° C. for a continuous period of about 24 hours, and have a vapor pressure low enough at about 400° F. to be extruded without gasing or reacting with the poly-α-olefin in the extruder. It appears that once the halogen of the vultard compound reacts with the poly-α-olefin resin, many desirable properties of the poly-α-olefin are lost, since bromination occurs.

While it is essential that the vultard compound contain bromine or chlorine or both and that the phosphate radical also be present in the system of this invention, it is possible that the phosphate compound can be separate from the bromine or chlorine compound such that the phosphate compound is one additive and that the bromine or chlorine (separate or in combination) is another essential additive; however, in either instance, the definitive requirement stipulated above for the vultard compound must apply in total to either or both (as the case may be) of the phosphate and halogen additives utilized. Representative examples of these compounds are Chlorowax, i.e., chlorinated paraffin containing 70 percent by weight chlorine; chlorinated napthalenes; tris (dichloropropyl) phosphate; tris (2-chloroethyl) phosphate; tris (bromochloropropyl) phosphate; cresyl diphenyl phosphate; and tripenyl phosphate.

When the phosphate is a part of the organic halogen compound such as to provide an organic halogen phosphate, there must be at least about 0.2 percent by weight, based on the total weight of the system, of elemental phosphorous present; however, when the phosphate is added separately as an organic phosphate, there need only be at least about 0.04 percent by weight, based on the total weight of the system, of elemental phosphorous present.

Since the aforedefined vultard compounds, which effect fire retardancy, are not compatible with poly-α-olefins, the incorporation of a specific dispersant(s) is also essential. Without the use of this dispersant, the possible concentrations of the fire retardant vultard compounds in the poly-α-olefins are far below those necessary to impart the requisite flame retardancy to the resin, practical extrudability is not achieved nor is required uniform distribution insured.

With the polymeric composition of this invention in fiber form, the fire retardant vultard compound must be present in amounts within the range of from about 2 percent to about 10 percent by weight, based on the total weight of the poly-α-olefin resin composition with from about 1.5 percent to about 7 percent by weight elemental bromine, or elemental chlorine, or a combination thereof. Most preferably, it is present within the range of from about 3 percent to about 8 percent with about 2 percent to about 6 percent elemental bromine or chlorine, or mixtures thereof present. At these levels, a 12-mil oriented, non-pigmented, monofilament extinguishes in less than 1 second after a 3-second ignition period. With less than 1.5 percent elemental bromine, chlorine, or mixtures thereof present, there is insufficient halogen to provide the required fire proofing, and above about 7 percent elemental halogen, problems regarding degrees of lack of compatibility and processability begin to appear and polymeric breakdown will be evidenced. If pigments are present, the lower limit given must be raised, and in that event, a minimum of about 2.5 percent elemental halogen is acceptable. Preferably, the upper limit for the amount of vultard compound present is 10 percent by weight, based on the total weight, however, this is dependent on the methods, processing techniques and apparatus used for mixing. The system of this invention may contain up to 15 percent by weight, based on the total weight, of vultard compound, i.e., organic bromine, a chlorine phosphate or mixtures thereof and thus up to about 10 percent elemental halogen, i.e., chlorine or bromine or mixtures thereof, however, with the presence of between about 10 percent and 15 percent of the vultard compound, extreme care must be taken to insure that the mixing time and temperature are held within such limits as to insure that the vultard compound is not activated or made reactive during the mixing and extrusion of the polymer. If it was activated, the halogen would be liberated and non-compatible by-products would be developed in the system.

The 2 percent to 10 percent organic halogen compound required for poly-α-olefin resins in fiber form is conditioned on the fact that the vultard have from at least 1.5 percent to about 7 percent elemental halogen. With less than 1.5 percent, there is insufficient elemental halogen present to effect the desired fire retardancy to the poly-α-olefin resin, and with above about 7 percent, the resin is generally not extrudable.

For use as a filament in fabric where both the warp and fill yarns contain the composition of this invention, the above limits are acceptable. However, in the event that only the warp or fill yarns contain the fire retardant additive, or in the event that less than substantially all of the filaments of the essentially poly-α-olefin fabric contain this additive, the lower requirement for elemental halogen must be set at about 4 percent.

If, on the other hand, the poly-α-olefin is to be formed or shaped into other than a filament, i.e., if there is to be less surface per unit of mass exposed to oxygen, and if it thus becomes difficult to obtain a high mass temperature in the shaped article, the amount of vultard compound used is less, although it must be present in amounts sufficient to satisfy all of the requirements recited earlier with respect to it. Loss of surface area is evidenced, for example, in a film or a molded article where there is less surface per unit of mass exposed to the air, and thus to oxygen, than there is for a filament. This inhibits combustion because less oxygen is available to support the combustion of the whole article. Additionally, in such a shaped article, there is greater cross section than that normally in existence for a small filament and it thus becomes difficult to attain a high mass temperature, i.e., the temperature attained in the polymer on exposure to the heat, which is normally sufficient to initiate combustion, since once again, there is less surface area exposed. Thus, the benefits of this invention are provided if there is as little as about 1 percent of vultard compound, containing at least about 0.7 percent elemental halogen, present in films of 5-7 mil thickness and in molded or other shaped articles of at least that thickness.

By the term "dispersant" as used herein is meant a dispersing agent for promoting the formation and stabilization of a dispersion of the fire retardant vultard compound in the poly-α-olefinic composition.

The dispersant is of extreme importance in this polymeric composition since it must be highly compatible with the vultard compound, the free radical initiator and the antioxidant used, i.e., sufficiently compatible at extrusion temperatures to prevent the separating out of the added ingredients which are essential to this invention, yet of sufficient compatibility in the system at end-use temperatures to preclude exudation or migration.

The dispersant is added to the system of this invention to rapidly, effectively, and efficiently disperse the active fire retardant additive, i.e., the vultard compound, substantially uniformly throughout the molten amorphous portion of the polymer without significantly impeding the crystallization of the polymer. The dispersant used herein must accomplish these features with respect to the vultard compound and, thus, overcome the known incompatibility of the vultard compound and the poly-α-olefin. Thus, the dispersant must certainly be compatible with both the poly-α-olefin and the vultard compound used, and it must readily disperse the vultard compound within the poly-α-olefin. It must also have permanence, which requires that it have a low vapor pressure and a low diffusion rate within the poly-α-olefin.

Representative of the dispersants which are capable of satisfying all of these requirements are chlorinated polyphenyl compounds which define any of the biphenyl or triphenyl compounds containing from about 20 percent to about 70 percent by weight chlorine or blends of chlorinated biphenyls and triphenyls containing from about 20 percent to about 70 percent chlorine. Suitable examples of such chlorinated polyphenyl compounds are chlorinated biphenyl containing 60 percent by weight chlorine, chlorinated triphenyl containing 60 percent by weight chlorine and a blend of chlorinated triphenyl and chlorinated biphenyl containing 65 percent by weight chlorine, etc. Other acceptable dispersants that satisfy the demanding requirements recited herein are a chlorinated napthalene sold under the trademark "Halowax" stearic acid, chlorendic anhydride, and selected waxes, etc.

The dispersant must be present in the composition of this invention in amounts from about 0.05 percent to about 20 percent by weight, based on the total weight of the resultant polyolefinic composition, with 0.5 percent to 10 percent being preferred. The exact range will vary with the dispersant selected. For example, chlorinated biphenyl can be used in amounts of up to 20 percent without exudation, whereas with stearic acid, exudation begins to occur at about 1 percent concentration and becomes prohibitive at greater than 4 percent. More than one dispersant may be added to the system, but their combined amounts must fall within the limits given above. Below about 0.05 percent, there is insufficient dispersant present to perform the functions required of it, and exudation of the vultard compound occurs on aging of the polyolefin resin and extrusion can become erratic. The economics involved do not warrant amounts above 20 percent by weight.

The free radical initiator additive acts, in this invention, to accelerate the decomposition of the fire retardant vultard compound at the ignition temperature of the poly-α-olefinic shaped article into which it is dispersed, such that sufficient active or free chlorine or bromine or both, i.e., halogen as used herein, is released to provide an inert elemental halogen atmosphere in contiguous or adjacent relationship to the surface of this shaped poly-α-olefin article, and to thus effectively retard its combustion. The free radical initiator acts, at the ignition temperature of this poly-α-olefinic shaped article, to provide a more efficient release of elemental halogen from the vultard compound additive than would occur in its absence. This improved efficiency provided by the free radical initiator significantly reduces the amount of elemental halogen which is necessary to provide specific levels of fire retardancy and eliminates the side effects, e.g., color instability, difficult processing, that greater amounts of bromine would promote in the system.

The free radical initiator must be a compound that will react at a sufficient rate to perform its intended function at the ignition temperature of the specific poly-α-olefin bearing the union of additives of this invention. It must act to significantly enhance the release of elemental halogen from the vultard compound additive.

More specifically, the free radical initiator, which is preferably an organic peroxide, is a chemical compound which catalyzes the release of elemental halogen from the vultard compound at the ignition temperature of the host poly-α-olefin. It must be extrudable at the extrusion temperature for the poly-α-olefin resin and it must be compatible with the poly-α-olefin resin, the vultard compound and the dispersant in the system. Also, it should have an acceptable vapor pressure and a half life of at least about 1 hour at 110° C. and preferably 15 hours at 110° C.

The free radical initiator must be present in at least 0.2 percent and preferably 0.5 percent by weight based on the total weight of the system. Below 0.2 percent, it has no significant effect on the vultard compound at ignition temperatures. Generally, the free radical initiator is not present in excess of 1 percent by weight based on the total weight of the system because the function it is to perform is ably accomplished with lesser amounts and because amounts in excess of 1 percent generally begin to contribute processing and economic problems to the system.

Since an intimate contact between the poly-α-olefin and the other additives of this invention is desired, the free radical initiator must be capable of being substantially uniformly dispersed within the polymer. Therefore, it must be in particulate solid, gaseous or liquid form. A large particle size would be acceptable if the compound became fluid at, or just prior to, reaction temperature. Representative examples of an organic peroxide defined by the foregoing requirements are dicumyl peroxide, 2, 5-dimethyl-2, 5-bis (tert butylperoxy) hexane; 2, 5-dimethly-2, 5-bis (tert butylperoxy) hexyne-3; di (tert butyl) peroxide; hydroperoxides, e.g., 2, 5-dimethylhexane-2, 5-dihydroperoxide; tertiary butyl hydroperoxide; cumene hydroperoxide; and mixtures of these free radical initiators; as for example, where one such free radical initiator will not by itself fully satisfy the requirements given herein for such a compound, but a combination of two or more such free radical initiators as defined herein does satisfy these requirements.

A racemization reaction evidenced by a poly-α-olefin, e.g., a polypropylene in the presence of a free radical initiator and a bromine compound is disclosed in copending application Ser. No. 656,110, now U.S. Pat. No. 3,515,687. By this racemization reaction, the polymer is sterically rearranged to provide several characteristic properties which differ dramatically from those that the polymer exhibited before the reaction. Such a change is not desired in this instance, since dramatically improved fire retardancy for the poly-α-olefin is the primary concern and the bromine compound utilized and defined herein provides this fire retardancy. The specific "inhibiting antioxidant" defined herein acts to prevent the above-described racemization reaction during processing conditions or the manufacture of the poly-α-olefinic shaped article of this invention, and to thus insure greatly improved fire retardancy.

The inhibiting antioxidant acts to prevent the free radical initiator from removing hydrogen from the polymer chain of the host poly-α-olefin, and racemization or chain splitting which results therefrom. The inhibiting antioxidant also acts to prevent secondary oxidation of the host polymer whereby carbonyl derivatives would be formed to destroy the basic polymer.

The antioxidant must act to protect the polymer against primary oxidation and side reactions that might occur as a result of the presence of the other additives.

The inhibitor antioxidants contemplated in the system of this invention must be compatible with poly-α-olefins, with the free radicals, the vultard compounds and the dispersants defining the union that is the instant invention. They must also be compatible at extrusion temperatures and at service temperatures, i.e., they must be nonexuding but they must also have sufficient heat stability at extrusion, casting or molding temperatures to permit the extrusion, etc., of the shaped poly-α-olefinic composition.

The inhibitor antioxidants should possess color stability such that there is little or no color change during or after the processing or during the reasonable life of the polymer. They must possess acceptive water resistance such that moisture will not readily leach it from the final product and thus permit primary or secondary oxidation of the host poly-α-olefin by the free radical initiator at, or near, ignition temperatures.

Representative of the inhibitor antioxidants which fall within these definitions are carbon; 2, 6-ditertiarybutyl-p-cresol; RA-1093; dioctadecyl-3, 5-di-t-butyl-4-hydroxybenzyl phosphonate; 2, 4-bis-(n-octylthio)-6-(3, 5-di-t-butyl-4-hydroxyanilino)-1, 3, 5-triazine; 2, 4-bis(3, 5-di-t-butyl-4-hydroxyphenoxy)-6-(n-octylthio)-1, 3, 5-triazine; octadecyl-β-(3, 5-di-t-butyl-4-hydroxyphenyl) propionate; dioctadecyl-3, 5-di-t-butyl-4-hydroxy-benzylphosphonate; 4, 4'-thio-bis(3 methyl-6-t-butylphenol); a 3:1 condensate of 3-methyl-6-tertiary-butyl phenol with crotonaldehyde; "Nonox WSP," i.e., an alkylated bis phenol and "Nonox CL;" 2, 2'-methylene (bis-4-methyl-6-t-butylphenol); 2, 2'-methylene (bis-4ethyl-5-t-butylphenol); 2, 6-di-t-butyl-α-dimethylamino-p-cresol; 2, 4, 5-tri-hydroxybutyrophenone and 2, 6-ditertiarybutyl-4-methylphenol.

To perform their function, these inhibitor antioxidants must be present in amounts sufficient to insure a content of from about 0.05 percent to about 2 percent by weight in the final polymer; however, within the more commercial aspects of the present invention, the use of from about 0.25 percent to about 0.75 percent by weight is contemplated.

A secondary antioxidant compound may be incorporated into the composition of this invention in order to improve the overall heat stability of the instant fire retardant poly-α-olefinic compositions, since this particular secondary antioxidant will act to suppress oxidation of the poly-α-olefin. The secondary antioxidant is usually an organic sulfur compound which functions to improve the efficiency of the primary antioxidant.

The second antioxidant may be present in an amount of from about 0 percent and from preferably 0.1 percent by weight to about 0.5 percent, or preferably 0.3 percent, by weight. Above 0.5 percent by weight, lack of compatibility in the instant system is evidenced.

Representative secondary antioxidants are di lauryl thiodipropionate; di stearyl thiodipropionate; and "Steroban 20," a modified polyester of thiodipropionic acid in which 80 percent of the necessary hydroxy groups are supplied by neopentyl glycol and 20 percent are supplied by stearyl alcohol.

The fire retardant poly-α-olefinic compositions of this invention are provided by the process which comprises combining from about 2 percent to about 10 percent vultard compound, from about 0.2 percent to about 1 percent free radical initiator, from about 0.05 percent to about 20 percent dispersant composition, from about 0.05 percent to about 2 percent of inhibitor antioxidant, from about 0 percent to about 0.5 percent of a secondary antioxidant, and from about 97.7 percent to about 66.5 percent poly-α-olefin. As was discussed earlier, the vultard compound may be an organic halogen phosphate or the place of the vultard compound may be taken by an organic bromine, an organic chlorine or an organic chlorine/bromine compound which may or may not also be a phosphate and, if it is not also a phosphate, the phosphate must be added separately.

The extrusion stability of the mixture can be improved with the addition of as little as 0.05 percent by weight, based on the total weight of the total blend, of stearic acid. However, care must be taken that not more than 4 percent by weight is added, since it tends to increase the flammability of the product at higher concentrations. It is preferred that from about 0.5 percent to about 1 percent be added. However, since stearic acid also functions as a dispersant, the requirements as to the amounts present must be made consistent with those specified as to the dispersant. But, in no event should there be greater than 4 percent stearic acid present, either in combination with another dispersant or alone. The stearic acid is found to be desirable in extrusion since it apparently keeps the screw clean and prevents reaction in the extruder due to catalytic action from the extruder parts.

Although a mixture of the components recited, i.e., the vultard compound and the specific dispersant (with or without stearic acid) is extrudable, it does not have sufficient compatibility with the olefin to be surface-absorbed into pellets of the resin via a prebaking technique of 30 minutes to several hours in a standard degree Fahrenheit oven. Thus, it is desirable, in this instance, that the poly-α-olefin resin used be in flake or powder form and that it be premixed by the method comprising: blending a particulate poly-α-olefin resin, a vultard compound, a free radical initiator, a dispersant for the vultard compound and an inhibitor antioxidant in a suitable mixer, e.g., a Hobart reed mixer, to provide a blend sufficiently free flowing to feed through the extruder hopper and also feed uninterruptedly through the extruder. If it is desirous that the blending be carried out at room temperature, i.e., at 80° F. or lower, both the resin and the additives should be at 80° F. or lower prior to mixing to prevent complete wetting-out of individual particles which would destroy free flowing properties of the blend. The mixing time should be limited to a short period of time, i.e., several minutes or less, to prevent complete wetting-out of individual particles. The premix can, of course, be readily pelletized if desired.

Preferably, a hot blending method of mixing is utilized whereby the poly-α-olefin resin is heated to a temperature within the range of from about 125° F. to about 200° F. The vultard compound, the dispersant for the vultard compound, the free radical initiator, the inhibitor antioxidant, and any other additives are heated together separate from the poly-α-olefin at a temperature within the 125° F. to 175° F. range, and preferably no higher than 150° F. in order to reduce premature decomposition of the free radical initiator. The additives are added to the resin and the composite is mixed thoroughly to distribute the additives substantially uniformly through the resin and allow uniform absorbency of the additives into the resin. The resultant mixture is free flowing and makes an excellent feed for extrusion or for other shaping procedures.

The blend is extruded at a temperature within the range of from about 350° F. to about 475° F. Below 350° F., viscosities are too high for good processing and above 475° F., polymer breakdown can occur. Below 350° F., the viscosity is too high for good extrusion and the results are also generally unrewarding, because liquid penetration or absorption into the polymer is almost entirely through the amorphous areas in the polymer and there is insufficient amorphisity in the poly-α-olefin below this temperature. During the blending the heat applied to the poly-α-olefin should be in an amount sufficiently below the melting point of the particular polymer to insure the maintenance of the particulate state of the resin and thereby insure the free flowing nature of this intermediate composition which facilitates ease of handling, etc., through the processing steps which will follow in providing the finished product. In general, the polymer should be extruded at a temperature of about 50° F. above the melting point of the polymer.

The addition of the dispersant permits rapid and complete diffusion of the particles of the active fire retardant vultard compound and effects rapid dispersion of this active ingredient uniformly throughout the polymer mass, thereby producing a uniform product.

In adding the dispersant to the organic halogen compound(s), these constituents are mixed sufficiently to provide a substantially homogeneous mixture.

This mixture is then combined with the particulate poly-α-olefin and the constituents are again thoroughly mixed to insure substantially uniform distribution of the constituents throughout the composite. It is very important in this latter mixing that the constituents be dispersed to provide a resultant resin blend which will insure extrusion of a uniform polymer such that areas within the polymer will not differ from adjacent polymer areas in chemical or physical properties. However, it is equally important that over-mixing is not practiced, if cold blending is utilized, since this would wet the individual particles of polypropylene and thus reduce the free-flowing property of the resin blend. If hot blending is practiced, it is equally as important that the ingredients be thoroughly mixed to insure even distribution and absorption of the additives into the polymer to insure uniform fire retardant properties. Such practices also insure a good free-flowing feed to the extruder to achieve a uniform extrusion without feed interruption, as a result of bridging in the hopper.

Extrusion is carried out at about 400° F. although an acceptable temperature range is established between about 375° F. and about 475° F. Extruding much below 375° F. will effect melt fracturing in the polymer and extruding much above 475° may effect an unwanted and destructive reaction between the constituents and the polymer.

The extrusion of this mixture should be accomplished at a temperature not in excess of about 475° F. since above that range an undesirable reaction may take place between the organic halogen compound and the poly-α-olefin which can result in a complete or partial loss of strength in the polymer along with the impairment or lessening of other desirable properties.

In fiber extrusion, the polymer is cooled and then heated to about 300° F. to be oriented by drawing and thus provide improved tensile strength in the polymer. Ideally, the drawing is undertaken using a ratio of 6:1, but a range of from about 4:1 to about 8:1 will prove satisfactory. It is understood that varying the draw ratio will vary the tensile strength of the polymer.

It is possible that 475° F. may be exceeded at, or during, extrusion. However, in that event, the dispersant(s) within the polymer system must be such that they will prevent the vultard compound from collecting to form concentrations of some greater mass within the polymer, and thus be in a number of sites with varying heat histories in sufficient concentrations to initiate reaction between the halogen of the vultard additive and the poly-α-olefin polymer. It is possible that in this event the dispersant and other functional additives selected will be ones falling within the definition given earlier, and which also have the tendency to reduce any undesirable activity and to pacify this tendency of the halogen of the vultard additive to react with the base poly-α-olefin polymer.

As was stated earlier, it is desirable that the poly-α-olefin be in the particulate form, i.e., in powdered or flake form, since, in this form, the additives are readily dispersed in it. These polymers are characterized by having a configuration such that all of the substituent groups, disregarding hydrogen, lie above or all below the plane of the main chain of the polymer. Examples of these include polyethylene, polypropylene, poly-1-butene and copolymers of these. The most preferable poly-α-olefin for use in this invention is polypropylene because of its very desirable chemical and physical properties.

It is desired that the poly-α-olefin resin be in particulate form, i.e., flake or granular form, since in that physical state it provided maximum surface area. This aids and encourages the entry of the mixture of the dispersant, the fire retardant vultard compound, and the other functional additives into the poly-α-olefin resin. Since the vultard compound and the poly-α-olefin resin are normally not compatible, some degree of difficulty might otherwise be experienced in so far as insuring at least the minimum amount of the fire retardant ingredient is dispersed within the poly-α-olefin resin.

It has been stated that the poly-α-olefin shaped articles of this invention are flame retardant. This is established by the following testing techniques.

The article, i.e., a fabric, film, etc. to be tested is held horizontally and the flame is brought into direct contact with the article and that position is maintained for a period of 5 seconds, giving a 5-second ignition period. With the removal of the flame from direct contact with the article, any flame which has been induced must cease to exist by self-extinguishing in a period less than 2 seconds to be acceptable. If, however, the article is single filament, then to measure its suitability for fabric used, the ignition period is lowered to 2 seconds, measuring the time to extinguish after each period of ignition.

The following rating system has been developed for measuring single filament performance using this test procedure and the average time to extinguish after the two second ignition period. If the flame continues for from 0 to 1 second after termination of the average two second ignition period, it is given an "excellent" fire retardancy rating. If the flame continues for from 2 to 5 seconds, the performance earns a "good" rating, and if it continues from 5 to 10 seconds, it receives a "fair" fire retardancy rating. If the flame continues over 10 seconds after the 2-second ignition period, the filament earns a "poor" rating.

If the filaments exhibit an "excellent" fire retardancy rating, it is only necessary that the warp or fill yarns in the fabric contain these filaments in order that the fabric will exhibit acceptable self-extinguishing properties. However, at the "good" and "fair" ratings, both the warp and fill yarns must contain the flame retardant filaments of this invention. A fabric composed of filaments in both the warp and fill that have earned only a "poor" rating is not self-extinguishable.

The effect of the present invention will be more readily understood by reference to the following detailed description in the accompanying drawings in which:

FIG. 1 depicts the effect of increasing amounts of vultard compound in poly-α-olefin compositions. Curves A and B reflect monofilaments prepared via Examples III–VII of Table I. The polypropylene compositions in each of the compositions prepared are the same except that the compositions of Curve A contain a free radical initiator compound, whereas those from which the points necessary to construct Curve B were taken do not contain a free radical initiator compound. Note that the presence of the free radical initiator compound provides a dramatic increase in the fire retardancy of the poly-α-olefin compositions.

Figure 2:
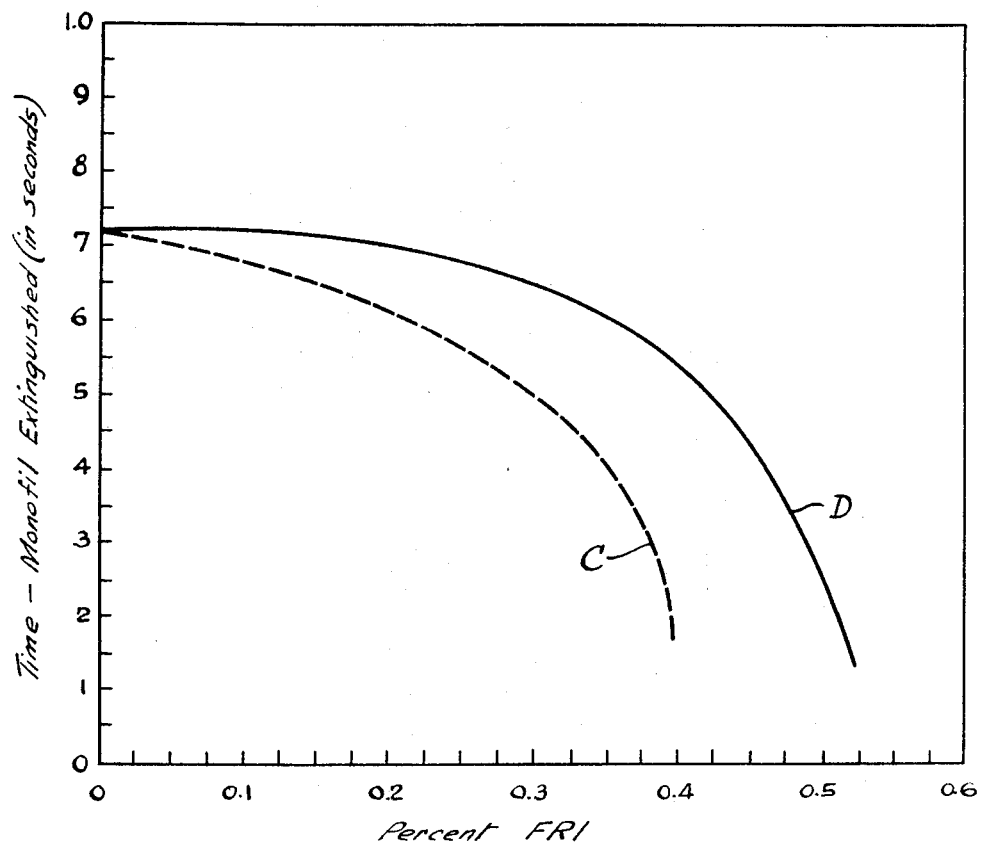

FIG. 2 provides a comparison of polypropylene compositions prepared via Examples X–XIV of Table II. The compositions represented by the Curve D contained varying amounts of stearic acid, i.e., a dispersant for the vultard compound, whereas those reflected by Curve C are the same as those represented by Curve D except that they contain no dispersant. Note the dramatic difference in fire retardancy.

The invention will be further illustrated by the following examples wherein all weights, unless otherwise stated, are given in parts by weight based on the total weight. It should be understood, however, that although these examples may describe, in particular detail, some of the more specific features of the invention, they are given primarily for purposes of illustration and the invention in its broader aspects is not to be construed as limited thereto.

EXAMPLE I

A polypropylene monofilament is prepared by adding 13 parts of Phosgard B–52–RS to 87 parts of Profax 6623, a polypropylene in flake form. The mixture is thoroughly agitated for from 10 to 15 seconds or more to insure a substantially homogeneous distribution and added to the hopper of a 24:1 L/D 1-inch extruder equipped with a 4:1 compression screw and a 60–40 screen pack. (This specific extruder will hereinafter be referred to simply as the 1-inch extruder.) The temperature of the screw section and that of the die assembly are set at 400° F. and the monofilaments extruded from the above-described mixture are of poor quality in that they break repeatedly and filament fibrillation is in evidence. Exudation occurs when the filaments extruded are stored for a period of time. Even with their poor quality, insofar as their textile characteristics are concerned, testing for fire retardancy earns a "good" rating for the filaments.

EXAMPLE II 1.0 parts of double pressed stearic acid and 10 parts of Firemaster T23P, i.e., tris-2, 3-dibromopropyl phosphate, are mixed together and the mixture is heated to 150° F. to dissolve the stearic acid and 0.4 parts of dicumylperoxide is added. As soon as the dicumyl peroxide has dissolved, the mixture is cooled to room temperature. The resultant paste of dicumyl peroxide, stearic acid and T23P is added to 83.5 parts of Profax 6501 flake polypropylene in a Hobart reed mixer using slow speed and the composite is blended for about 10 to 30 seconds or until the paste is substantially uniformly distributed throughout the resin. Six parts of black pigment in pellet form, i.e., black concentrate D 1921, i.e., carbon black, is added and the mixing is continued for several seconds, but only to the extent necessary to distribute the pigment. Overmixing will wet the individual particles, reducing the free-flowing property of the resin blend. A good free-flowing feed to the extruder is desirable in order to achieve a uniform extrusion without feed interruption as a result of bridging in the hopper.

The resin blend is added to the hopper of a 24:1, L/D extruder equipped with a 4:1 compression screw and a 60–40 screen pack. It is desirable that all parts be either chrome plated or constructed of non-reactive metals to minimize reaction in the extruder. The temperatures in the screw section and in the die assembly are set at 400° F.

Using a 1-inch extruder with a die opening of 0.045 inch, the resin blend is extruded at a rate of 33.5 feet per minute, quenched in water at room temperature, and oriented under infrared (at about 300° F.) at a ratio of 6:1 to produce 13:3 mil filaments which have a tensile of about 27,000 p.s.i. These filaments are woven (both warp and fill) into an open mesh fabric with a count of 20 inches × 26 inches. The filament is exposed to a 2-second ignition period whereupon it extinguishes itself within 2 seconds.

EXAMPLES III – VII

Following the procedure of Example II, the following examples, reported in Table I, are performed. The constituent parts utilized and the test results are reported in Table I.

TABLE I [1]

| Example | Poly-α-olefin | Bromine compound | Dispersant | Free radical initiator | Antioxidant | Self-extinguishing using 2 second ignition period |
|---|---|---|---|---|---|---|
| III | 94%, 6501 polypropylene | 3%, Firemaster T23P | 1% stearic acid | 0.5% dicumyl peroxide | 1.5% carbon | 10 seconds. |
| IV | 92%, 6501 polypropylene | 5%, Firemaster T23P | do | do | do | 6 seconds. |
| V | 88%, 6501 polypropylene | 9%, Firemaster T23P | do | do | do | 2 seconds. |
| VI | 92.5%, 6501 polypropylene | 5%, Firemaster T23P | do | do | do | 9 seconds. |
| VII | 88.5%, 6501 polypropylene | 9%, Firemaster T23P | do | do | do | 7 seconds. |

[1] All weights are given in percent by weight based on the total weight.

EXAMPLE VIII 79.3 parts of 6501, flake polypropylene is preheated to a temperature of about 150° F. A separate mixture is prepared utilizing nine parts of tris-2, 3-dibromopropyl phosphate, 9 parts chlorinated biphenyl containing 54 percent chlorine, 0.7 parts 2, 6-di-t-butyl-4-methyl phenol, 0.5 parts distearyl thiodipropionate, one part of 90 percent tert-butyl hydroperoxide and this mixture is heated to a temperature of about 150° F. to dissolve the solid ingredients. The heated mixture is then added to the preheated polypropylene resin and the composite mixture is blended in a Hobard reed mixer for 10 to 15 minutes. The resultant blend is used as a feed to a 1-inch extruder and a 10-mill monofilament is prepared utilizing the extrusion procedure given in Example II.

Following a 2-second ignition period, the monofilament self-extinguished itself immediately.

Similar results are obtained utilizing flake polyethylene and poly-1-butene resin.

EXAMPLES IX – XIII

Following the procedure of Example VIII, the examples reported via Table II are performed. All weights reported therein are in percent by weight based on the total weight of the composition.

TABLE II

| Example | Poly-α-olefin | Bromine compound | Dispersant | Free radical initiator | Antioxidant | Self-extinguishing using 2 second ignition period |
|---|---|---|---|---|---|---|
| IX | 88.5%, 6501 flake polypropylene | 9% Firemaster T23P | 1% stearic acid | | 1.5% carbon black | 8 seconds. |
| X | 88.4%, 6501 flake polypropylene | do | do | 0.1% dicumyl peroxide | do | 8 seconds. |
| XI | 88.3%, 6501 flake polypropylene | do | do | 0.2% dicumyl peroxide | do | 7 seconds. |
| XII | 88.1%, 6501 flake polypropylene | do | do | 0.4% dicumyl peroxide | do | 5 seconds. |
| XIII | 88%, 6501 flake polypropylene | do | do | 0.5% dicumyl peroxide | do | 2 seconds. |

EXAMPLE XIV

Following the procedure of Example VIII, 86.2 parts of 6501 flake polypropylene is preheated to a temperature of about 150° F. and added to a mixture, heated to about 150° F. also, of five parts Firemaster T23P, seven parts chlorinated biphenyl containing 52 percent chlorine, 0.5 parts 2,4-di-t-butyl-6-methyl phenol, 0.3 parts dilauryl thiodipropionate and one part 2-hydroxy-4-n-octoxybenzophenone. A 10-mil monofilament is extruded and tested utilizing a 2-second ignition period. The filament self-extinguishes itself almost immediately.

The above was repeated substituting, in one instance, dicumyl peroxide for the free radical initiator and in two other instances substituting di-tertiary butylperixode and 2,5-dimethylhexane-2,5-dihydroperoxide for the free radical initiator. The results obtained after a 2-second ignition period are virtually the same.

EXAMPLES XV – XVIII

The procedure of Example VIII is repeated substituting Chlorowax 70 (chlorinated paraffin with 70 percent chlorine) for Firemaster T23P and utilizing the compound tri cresyl phosphate to supply the required phosphate component. The poly-α-olefin is 6501 flake polypropylene, the free radical initiator is tert-butyl hydroperoxide and 4,4'-thio-bis (tertbutyl paracresol) is the anti oxidant. The examples performed are reported via Table III. All weights reported therein are in percent by weight based on the total weight of the composition.

TABLE III

| Example | Poly-α-olefin | Halogen compound | Dispersant | Free radical initiator | Phosphate compound | Antioxidant | Self-extinguishing using 2 second ignition period |
|---|---|---|---|---|---|---|---|
| XV | 83.4%, 6501 flake polypropylene. | 7.0 Chlorowax 70 [1] | 1% stearic acid | 1.5% tert-butyl hydroperoxide. | 7.0 tri cresyl phosphate. | 0.1 Santonox, 4,4'-thio-bis (3-methyl,6-t-butyl phenol) or diallylphenol sulfide. | 0.5–1 second. |
| XVI | 88.15, 6501 flake polypropylene. | 7.0 Chlorowax 70 | do | 0.75 tert-butyl hydroperoxide. | 3.0 tri cresyl phosphate. | do | >5 seconds. |
| XVII | 88.15, 6501 flake polypropylene. | 3.0 Chlorowax 70 | do | do | 7.0 tri cresyl phosphate. | do | 2–3 seconds. |
| XVIII | 91.4, 6501 flake polypropylene. | 3.0 Chlorowax 70 | do | 1.5 tert-butyl hydroperoxide. | 3.0 tri cresyl phosphate. | do | 1–2 seconds. |

[1] Chlorinated paraffin with 70%/wt. chlorine.

Similar results are obtained when the organic halogen phosphate is one compound and is tris (dichloropropyl) phosphate; tris (β-chloroethyl) phosphate; tris (bromochloropropyl) phosphate, or when the halogen compound and the phosphate compounds are again separate, e.g., chlorinated paraffin and diphenyl phosphate or triphenyl phosphate.

It will be apparent that many widely different embodiments of this invention may be made without departing from the spirit and scope thereof. Therefore, the invention is not intended to be limited except as indicated in the appended claims.

I claim:

1. A fire retardant poly-α-olefin shaped article comprising a union of from about 66.5 percent to about 97.7 percent by weight, based on the total weight of the poly-α-olefin composition, of a poly-α-olefin, from about 1 percent to about 15 percent by weight, based on the total weight of the poly-α-olefin composition, of an active fire retardant additive selected from the group consisting of an organic bromine phosphate, an organic chlorine phosphate, said organic bromine phosphate and said organic chlorine phosphate being capable of providing at least about 0.2 percent by weight of elemental phosphorus, based on the total weight of the poly-α-olefin composition, mixtures of organic bromides and organic phosphates, mixtures of organic chlorides and organic phosphates, and mixtures thereof, said organic phosphates being capable of providing at least about 0.04 percent by weight of elemental phosphorus, based on the total weight of the poly-α-olefin composition, said organic bromine phosphate and said organic chlorine phosphate and said organic bromides and said organic chlorides and mixtures thereof being capable of providing from about 0.7 percent to about 10 percent by weight of elemental halogen, said active fire retardant additive not being compatible with said poly-α-olefin, a dispersant for promoting the formation and stabilization of a dispersion of said active fire retardant additive in the poly-α-olefin composition, said dispersant being present in an amount of from about 0.05 percent to about 20 percent by weight, based on the total weight of the poly-α-olefin composition, from about 0.2 percent to about 1 percent by weight, based on the total weight of the poly-α-olefin composition of a free radical initiator capable of accelerating the decomposition of said active fire retardant additive at the ignition temperature of said poly-α-olefin in which it is dispersed to release sufficient free halogen therefrom to retard the combustion of said poly-α-olefin, said free radical initiator being compatible with said poly-α-olefin, said active fire retardant additive and said dispersant, and from about 0.05 percent to about 2 percent by weight, based on the total weight of the poly-α-olefin composition, of an inhibitor-antioxidant which is compatible with said poly-α-olefin, said active fire retardant additive, said dispersant, and said free radical initiator and which is capable of inhibiting racemization or chain splitting of said poly-α-olefin and of preventing oxidation of said poly-α-olefin.

2. The shaped article of claim 1 wherein said active fire retardant additive is selected from (a) $(BrCH_2CHBrCH_2O)_3-P=O$ and (b)
$$\begin{array}{c} BrCH_2 \\ | \\ ClCH_2CH \\ | \\ ClCH_2CHCH_2O \end{array} \begin{array}{c} O \\ \| \\ -P-O-CH- \\ | \\ Br \end{array} \begin{array}{c} O \\ \| \\ -P-(OCH_2CHCH_2Cl)_2 \\ | \\ CH_3 \end{array}$$

3. The shaped article of claim 1 wherein said active fire retardant additive is selected from the group consisting of tris(dichloropropyl) phosphate, tris(2-chloroethyl) phosphate, tris(bromochloropropyl) phosphate and mixtures thereof.

4. The shaped article of claim 1 wherein said dispersant is selected from the chlorinated polyphenyl compounds containing from about 2 percent to about 70 percent by weight chlorine and blends thereof.

5. The shaped article of claim 1 wherein there is sufficient active fire retardant additive to provide at least about 1.5 percent by weight elemental chlorine and wherein said poly-α-olefin composition is a filament.

6. The shaped article of claim 1 wherein said dispersant is present in from about 0.5 percent to about 10 percent by weight.

7. The composition of claim 1 wherein said free radical initiator is present in at least about 0.5 percent by weight.

8. The composition of claim 1 wherein said inhibitor-antioxidant is present in from about 0.1 percent to about 0.3 percent by weight.

9. The composition of claim 1 wherein said poly-α-olefin is selected from polyethylene, polypropylene, poly-1-butene and copolymers thereof in filament farm.

10. The composition of claim 1 wherein said active fire retardant additive comprises a mixture of (a) an organic phosphate compound and (b) an organic halogen compound selected from the group consisting of an organic bromine compound, an organic chlorine compound and mixtures thereof.

11. The filament of claim 9 wherein said dispersant is present in an amount of from about 0.5 percent to about 10 percent by weight.

12. The filament of claim 9 wherein said free radical initiator is present in an amount of at least about 0.5 percent by weight.

13. The filament of claim 9 wherein said inhibitor-antioxidant is present in an amount of from about 0.1 percent to about 0.3 percent by weight.

14. The filament of claim 9 wherein said active fire retardant additive is selected from (a) $(BrCH_2CHBrCH_2O)_3-P=O$ and (b)
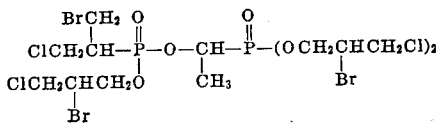

15. The filament of claim 9 wherein said active fire retardant additive is selected from the group consisting of tris(dichloropropyl) phosphate, tris(2-chloroethyl) phosphate, tris(bromochloropropyl) phosphate and mixtures thereof.

16. The filament of claim 9 wherein said active fire retardant additive comprises a mixture of (a) an organic phosphate compound and (b) an organic halogen compound selected from the group consisting of an organic bromine compound, an organic chlorine compound and mixtures thereof.

17. The filament of claim 9 wherein said free radical initiator is an organic peroxide.

18. The filament of claim 9 wherein said dispersant is selected from chlorinated polyphenyl compounds containing from about 20 percent to about 70 percent by weight chlorine and blends thereof.

19. A woven fabric wherein the warp or the fill yarn is composed essentially of the filament of claim 9.

20. A woven fabric comprising the filaments of claim 9.

21. A fire retardant poly-α-olefin shaped article comprising a union of from about 66.5 percent to about 97.7 percent by weight, based on the total weight of the poly-α-olefin composition, of a poly-α-olefin, from about 2 percent to about 10 percent by weight, based on the total weight of the poly-α-olefin composition, of an active fire retardant additive selected from the group consisting of an organic bromine phosphate, an organic chlorine phosphate, said organic bromine phosphate and said organic chlorine phosphate being capable of providing at least about 0.2 percent by weight of elemental phosphorus, based on the total weight of the poly-α-olefin composition, mixtures of organic bromides and organic phosphates, mixtures of organic chlorides and organic phosphates, and mixtures thereof, said organic phosphates being capable of providing at least about 0.04 percent by weight of elemental phosphorus, based on the total weight of the poly-α-olefin composition, said organic bromine phosphate and said organic chlorine phosphate and said organic bromides and said organic chlorides and mixtures thereof being capable of providing from about 1.5 percent to about 7 percent by weight of elemental halogen, said active fire retardant additive not being compatible with said poly-α-olefin, a dispersant for promoting the formation and stabilization of a dispersion of said active fire retardant additive in the poly-α-olefin composition, said dispersant being present in an amount of from about 0.5 percent to about 10 percent by weight, based on the total weight of the poly-α-olefin composition, from about 0.2 percent to about 0.5 percent by weight, based on the total weight of the poly-α-olefin composition of a free radical initiator capable of accelerating the decomposition of said active fire retardant additive at the ignition temperature of said poly-α-olefin in which it is dispersed to release sufficient free halogen therefrom to retard the combustion of said poly-α-olefin, said free radical initiator being compatible with said poly-α-olefin, said active fire retardant additive and said dispersant, and from about 0.25 percent to about 0.75 percent by weight, based on the total weight of the poly-α-olefin composition, of an inhibitor-antioxidant which is compatible with said poly-α-olefin, said active fire retardant additive, said dispersant, and said free radical initiator and which is capable of inhibiting racemization or chain splitting of said poly-α-olefin and of preventing oxidation of said poly-α-olefin.

22. A fire retardant poly-α-olefin shaped article as defined in claim 1 wherein the free radical initiator is from the group of organic peroxides and hydroperoxides.

23. A fire retardant poly-α-olefin shaped article as defined in claim 1 wherein the free radical initiator is from the group of dicumyl peroxide; 2,5-dimethyl-2,5-bis (tert. butylperoxy) hexane; 2,5-dimethyl-2,5-bis (tert. butylperoxy) hexyne-3; di(tert. butyl)peroxide; 2,5-dimethylhexane-2,5-dihydroperixode; tertiary butyl hydroperoxide; cumene hydroperoxide; and mixtures thereof.

24. A fire retardant poly-α-olefin shaped article as defined in claim 1 wherein the inhibitor-antioxidant is from the group of 2,6-ditertiarybutyl-p-cresol; dioctadecyl-3,5,-di-t-butyl-4-hydroxybenzyl phosphonate; 2,4-bis-(n-octylthio)-6-(3,5-di-t-butyl-4-hydroxyanilino)-1,3,5-triazine; 2,4-bis-(3,5-di-t-butyl-4-hydroxyphenoxy)-6-(n-octylthio)-1,3,5-triazine; octadecyl-β-(3,5-di-t-butyl-4-hydroxyphenyl)propionate; 4,4'-thio-bis(3-methyl-6-t-butyl phenol); a 3:1 condensate of 3-methyl-6-tertiary-butyl phenol with crotonaldehyde; 2,2'-methylene(bis-4-methyl-6-t-butyl phenol); 2,2'-methylene(bis-4-ethyl-5-t-butyl phenol); 2,6-di-t-butyl-o(-di-methylamino-p-cresol; 2,4,5-tri-hydroxybutyrophenone; and 2,6-di-tertiary butyl-4-methyl phenol.

* * * * *